Aug. 24, 1954   J. E. RIGGS   2,687,105
PIPE ALIGNING RACK
Filed March 20, 1952   3 Sheets-Sheet 1
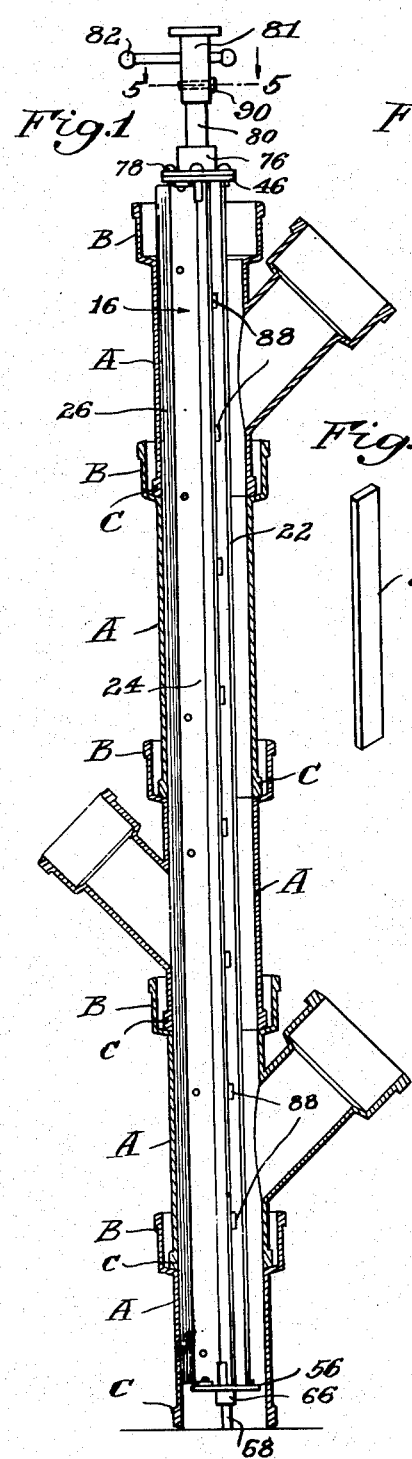
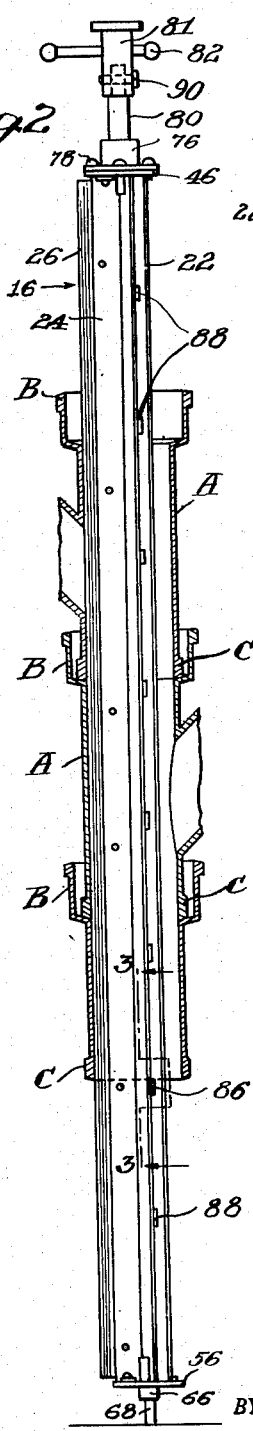
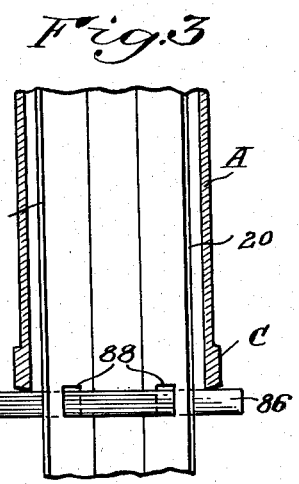
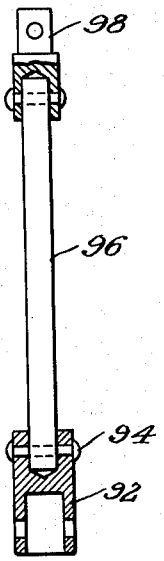
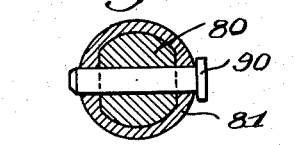
INVENTOR.
James E. Riggs
BY Charles Shepard
Attorney

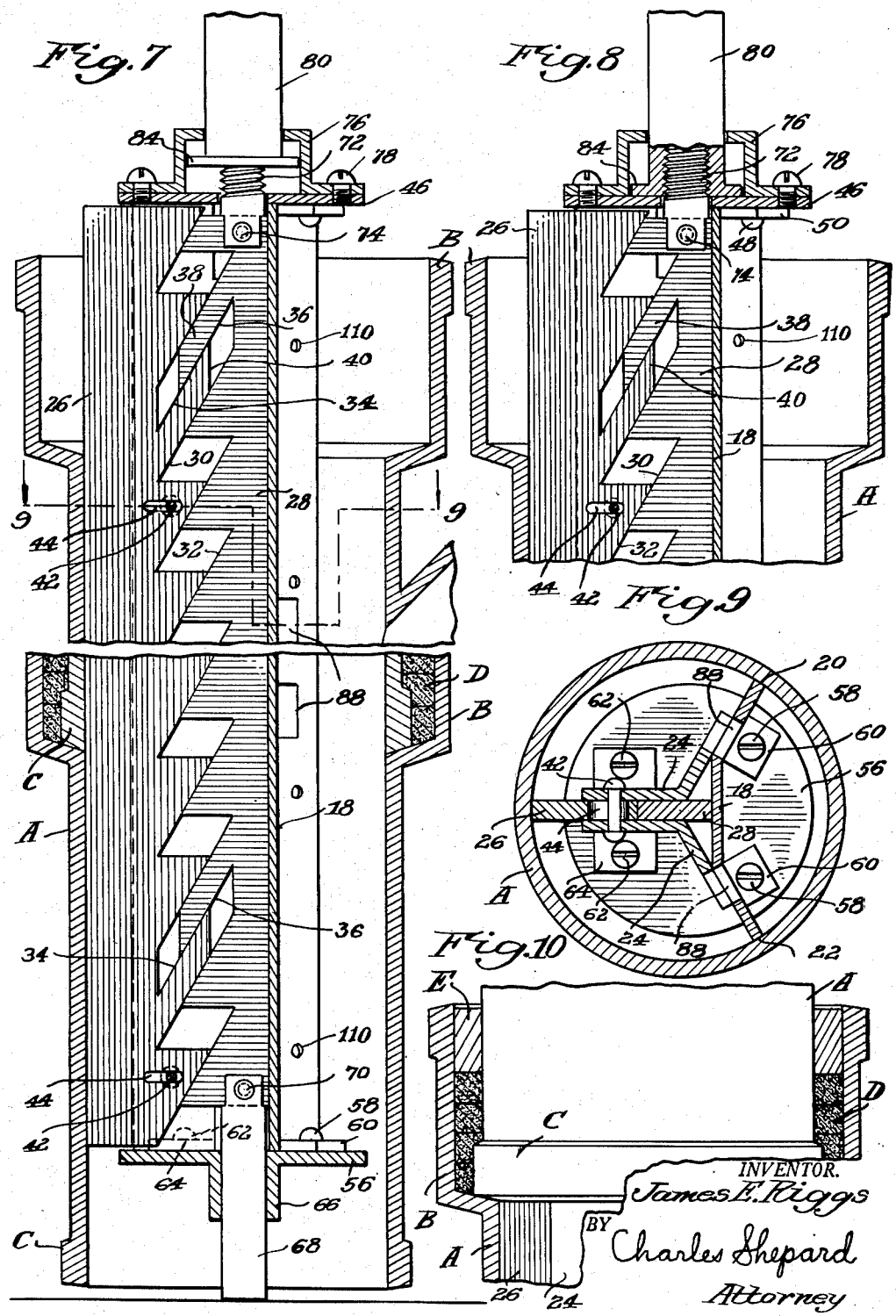

Aug. 24, 1954 — J. E. RIGGS — 2,687,105
PIPE ALIGNING RACK
Filed March 20, 1952 — 3 Sheets-Sheet 3
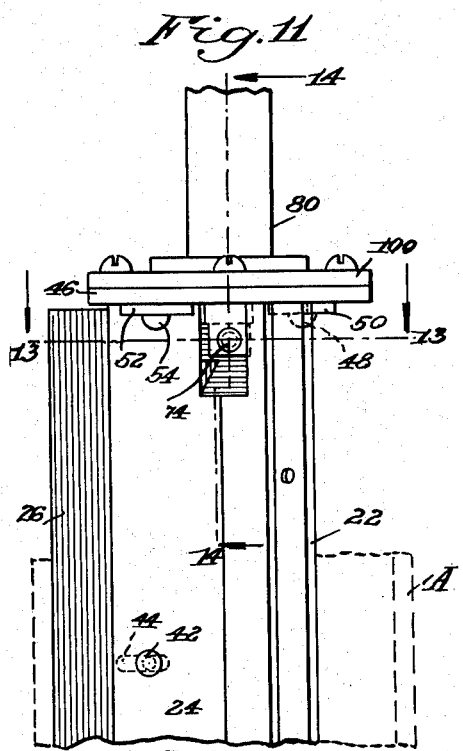
Fig. 11
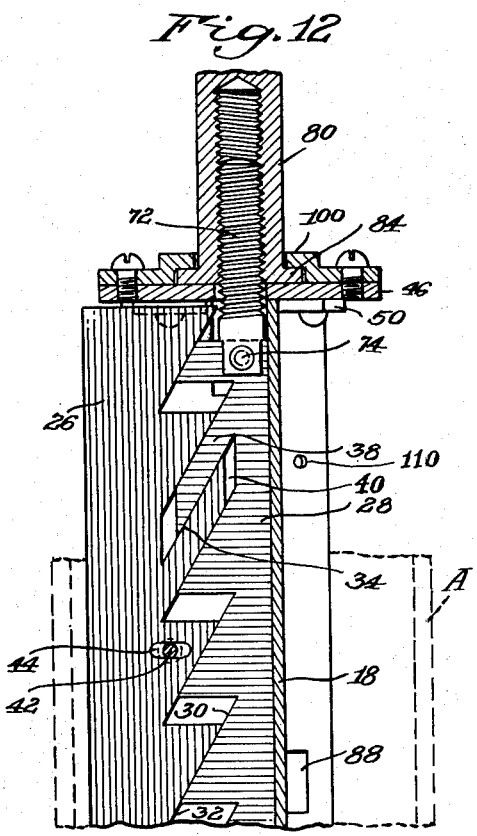
Fig. 12
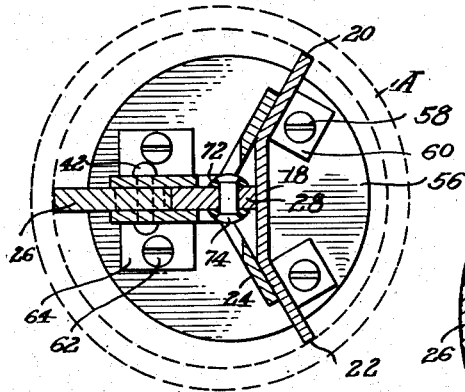
Fig. 13
Fig. 14
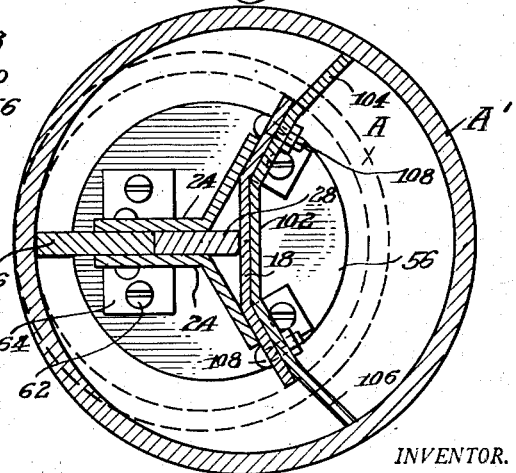
Fig. 15
INVENTOR.
James E. Riggs
BY Charles Shepard
Attorney

Patented Aug. 24, 1954

2,687,105

UNITED STATES PATENT OFFICE 2,687,105

PIPE ALIGNING RACK

James E. Riggs, Rochester, N. Y.

Application March 20, 1952, Serial No. 277,701

3 Claims. (Cl. 113—103)

1

The present invention relates to plumbing and pipe fitting and more particularly to tools or fixtures for temporarily holding adjoining pipe sections in abutment and in alinement while their joints are being worked upon in a sealing operation and it has for its general object to provide a sturdy structure of this character that will be simple in construction, convenient to operate, and serve to save time and effort in a variety of circumstances under which it is desired to assemble, in alinement, a series of pipe sections for the sealing or completion of their joints.

Another object of the invention is to provide a rack of this nature upon which a series of assembled pipe sections may be erected to an upright position in which a workman is required to do less stooping while processing the joints but allows him to operate in a natural position, all of which further facilitates the making of leaded joints, for instance, in which molten material is poured, the latter tending to level off gravitationally with the use of this invention.

A further object is to provide a rack which, while fitted with mechanical operating means for clamping the pipe sections rigidly in alinement, is also capable of so automatically clamping them, the clamping jaws being automatically actuated by the weight of the rack frame together with that of the pipes.

These and other desirable objects may be attained in the manner disclosed as an illustrative embodiment of the invention in the following description and in the accompanying drawings forming a part hereof, in which:

Fig. 1 is a side view of one form of clamping rack constructed in accordance with the present invention showing in vertical central section a stack of four pipe sections clamped thereon in alinement ready for a further sealing of their joints;

Fig. 2 is a similar view of the same structure but illustrative of the use of an added bridge piece for similarly supporting and automatically clamping a lesser number of pipe sections in an erect stack where they may be worked upon at a convenient height for the operator;

Fig. 3 is an enlarged fragmentary elevation viewed from the right of the showing of Fig. 2 with the bridge piece of the latter showing appearing in side elevation; the adjoining pipe section end that rests thereon being again in section;

Fig. 4 is an enlarged side view, partly in section, of an extension operating crank that may be substituted for that shown in Figs. 1 and 2;

2

Fig. 5 is a further enlarged transverse section through the operating crank fitting on the line 5—5 of Fig. 1;

Fig. 6 is an enlarged perspective view of the bridge piece mentioned with reference to Figs. 2 and 3;

Fig. 7 is an enlarged vertical central section through the clamping rack and stack of pipe sections of Fig. 1 showing the movable jaw and its actuating bar in side elevation and in clamping position under stress from the lower automatic operating means, intermediate portions of the rack and pipe stack being broken away;

Fig. 8 is a similar fragmentary view of the upper crank operated means acting upon the actuating bar for clamping movement;

Fig. 9 is a transverse horizontal section taken on the line 9—9 of Fig. 7;

Fig. 10 is an enlarged fragmentary vertical section in the plane of Fig. 7 through the completed joint between two pipe sections as produced with the aid of the present device, the upper pipe appearing in elevation;

Fig. 11 is an enlarged side elevation of the upper end of the clamping rack as it appears in Fig. 1 but fitted with a slightly different connection between the crank operating means and the frame and movable jaw;

Fig. 12 is a vertical central section similar in general to Fig. 8 but illustrating the same modified operationg means as in Fig. 11, and showing the movable clamping jaw in released position;

Fig. 13 is a transverse section on the line 13—13 of Fig. 11;

Fig. 14 is a detail fragmentary vertical section taken on the line 14—14 of Fig. 11; and Fig. 15 is an enlarged transverse section similar to Fig. 13 but illustrative, additionally, of a detachable adapter element that may be applied to accommodate the rack to pipes of larger size than those shown in the other figures.

The same reference numerals throughout the several views indicate the same parts.

In general, the present invention is more particularly useful in the assembly of a line of drainage or waste pipe sections which are cast or shaped from iron or terra cotta of fairly large diameter and hence the preparation of this sort of line is illustrated as an example.

Referring more particularly to the drawings, such a pipe line, or a portion of it, is shown in Figs. 1 and 2 composed of a series of pipe sections or units the barrels of which are indicated at A, the upper bell end or hub at B and the lower spigot end that takes into and seats against the bottom of the bell end of the adjoining pipe below at C. The common practice is to yarn in a quantity of oakum to partially form a seal at D in the space encircling the joint thus made, pack it down and finally pour in a covering of molten lead as generally indicated at E in Figs. 7, and 10.

This is usually accomplished with the assembled sections lying on the ground or at the bottom of a properly graded trench in which they are to remain. They are alined in a crude way by propping up the barrels with bricks or loose earth to meet the levels established by the greater diameters of the bell ends. If the line is being prepared as a fall line it is subsequently erected, several lengths at a time, to its vertical position on location unless circumstances are such that it can be calked and sealed there in the first place but with nothing to hold the alinement of the pipe sections during the process. Furthermore, when the line sections are in the prone position on the ground the workman must sit or squat above them, reach around them to their obscured under sides and, in the pouring of the lead seal, use special devices to direct the molten metal into the generally vertically disposed joint.

With the present invention, under the same circumstances of construction, the pipe sections need be only roughly alined on the ground, end to end. Then a long rack frame is thrust through them all so that they are strung upon it and can be threaded along endwise into proper abutment of the respective cooperating bell and spigot ends whereupon expanding jaws on the frame with operating means at the ends of the frame are caused to grip the inner walls of each and all of the sections and maintain them firmly in rigid alinement. Thereupon the frame and assembled pipe line together are erected to an upright position to rest on one end and propped there in any convenient manner during the process of yarning, calking and sealing, as before. The workman is mostly himself upright, he is free to move around the pipe column and approach it from all sides and the pouring of the molten lead is direct and unobstructed to neatly reach a natural uniform gravitational level. The jaws are then retracted and the rack withdrawn endwise, vertically in some situations or after the assembly has been laid upon the ground again all in one piece.

In this view and referring more particularly to the drawings, 16 indicates the central rack frame of the general shape in cross section of the letter Y (Fig. 13). The spread portion is joined, as by welding, to a plate 18 similarly spread or arched transversely to provide at its longitudinal edges two straight fixed jaw contacts 20 and 22 for the inner walls of the pipe line. The stem portion of the Y frame consists of a pair of parallel plates 24 continuous on each side with the spread portions and constituting a guide for a laterally movable, that is, expansible and retractable, longitudinally extending jaw plate 26 and for a longitudinally extending and longitudinally movable actuating bar 28. The radial dispositions of the two fixed jaw contacts 20 and 22 and the movable jaw 26 are preferably such as to trisect the internal circumference of the pipe section bodies A which all may uniformly and continuously make contact throughout their lengths with the jaws.

The proximate side edges of the movable jaw plate 26 and the actuator bar 28 are provided with complementary cam surfaces 30 and 32, respectively (Figs. 7, 8, and 12), produced by cooperating tooth-like formations on each. Thus, when the actuating bar 28 is drawn or pushed upwardly, backed as it is by the plate 18, it will thrust the movable jaw 26 outwardly into clamping engagement with the pipe interior as in Figs. 7 and 8, the fixed jaw contacts on the frame reacting against opposite pipe walls. Interspersed at intervals with these cooperating cam surfaces are reverse cam contacts of the same nature on the jaw and actuating bar, as indicated at 34 and 36, respectively, as a result of which a downward thrust on the actuating bar 28 will positively disengage and retract the movable jaw to the inward position of Fig. 12. Both sets of these expanding and retracting cams, for instance, are furnished at top and bottom by cam fingers 38 and 40 on the bar and jaw, respectively, each taking into inclined slots in the opposite member.

Parallel lateral or transverse movement of the jaw 26 is defined by pins 42 on the frame plates 24 (Figs. 7 and 9) cooperating with transverse slots 44 in the jaw.

The rigid frame 16 as a whole terminates at the top in a cap plate 46 to which fixed jaw plate 18-22 is rigidly secured as by screws 48 passing through ears 50 thereon that abut the underside of the cap plate while similar ears 52 on the guide plates 24 of the frame are similarly secured at 54. At the bottom the frame terminates in a base plate 56 secured to the lower end thereof in the same manner as is the cap plate above with screws 58 (Figs. 7 and 13) passing through ears 60 and screws 62 passing through ears 64 extending from guide plates 24 of the rigid frame. The base plate has a central hub 66 forming a guide for a projecting plunger 68 that is rigid with and constitutes an extension of the actuating bar 28 to which it is, in the present instance, riveted at 70.

The purpose and function of this projecting plunger will be later explained.

Returning to the cap plate 50, this carries means (Figs. 7 and 8) for manually operating the actuating bar 28 in both directions for which purpose a threaded extension 72 passing freely through a central opening in the cap plate is riveted to the actuating bar at 74. In the showing of these figures and Figs. 1 and 2, as distinguished from that of Figs. 11, 12 and 14, the cap plate is surmounted by a guide housing 76 secured thereto by screws 78. The interiorly threaded shank 80 of a cranking element 81 embodying a transversely slidable gripping bar 82 extends through the top of the guide housing and screws onto the threaded projection 72 on the actuating bar 28. This shank terminates in an annular flange 84 so that as the cranking element is turned (with a right hand thread) in a clockwise direction it will ultimately abut the cap plate 46, as in Fig. 8, and draw the threaded extension 72 and hence the actuating bar upwardly and expand into clamping position the pipe engaging jaws 20, 22, and 26. When turned in the opposite direction it will ultimately be stopped by engagement of flange 84 with the top wall of the housing whereby it will force the threaded extension 72 and hence the actuating bar 28 downwardly to reverse the cam action and, by retracting movable jaw 26, release the whole structure for withdrawal from engagement with the pipe line.

There is thus established in the hand crank operating mechanism a lost motion connection between it and the actuating bar 28 which appears in Fig. 7 where the stop flange 84 is midway between the cap plate surface and its limiting contact with the top of the housing. In other words, it has been released from the pipe clamping position of Fig. 8 but has not yet reached the jaw retracting position in which it abuts the top of the housing and begins to force the actuating bar downwardly. It is this lost motion that permits the functioning of the previously described projecting plunger 68 on the bottom end of the actuating bar 28.

It will be observed that when, as in Fig. 7, the sections of a pipe line are assembled on the clamping rack with the plunger 68 protruding beyond the spigot end of the bottommost pipe and the assembly is then erected, as first above outlined, the said plunger will rest on the ground and directly, rigidly support the actuating bar 28 in fixed position. But the weight of the rack frame plus the weight of the longitudinally immovable expanding jaw 26 will cause these parts to wedge downwardly on the now static slopes of the actuator bar cams 32 and hence expand the movable jaw 26 and cause it to grip the pipe walls as before. As soon as this gripping begins to take effect it is obvious that the weight of the pipe sections in the line themselves will add force to this automatic clamping operation of the actuating bar from the plunger support below. Of course it is convenient to use the hand crank operating means at the other end of the rack, as before, to finally release the jaws though this could also be accomplished in other ways as by resting the stack of pipe sections on the end edge of the lowermost section and tapping the actuator bar loose while the plunger 68 is out of contact.

Of course the automatic clamping and the manual operating means may be used together as the former augments the function of the latter when the plunger protrudes and takes the weight of the assembly.

Figs. 2, 3, and 6 are best illustrative of additional structure serving a further useful purpose in the functioning of the rack clamp. When it is desired to join only two or three pipe sections at a time or less than the full capacity of the frame, a bar 86 constituting a bridge piece or stop may be thrust through a selected one of a number of relatively spaced transverse openings or seats 88 in the frame plates (see also Fig. 9) to project at either side and form an elevated rest for the end of the bottommost pipe. In this way the workman has all the joints at a height convenient to him without the necessity of reaching or stooping. Either or both clamp operating means are used as before.

Again, if the capacity of the rack frame is taxed to the limit so that the line of pipe sections would tend to project at both ends, an extension operating crank fitting is provided which is shown in Fig. 4. In such cases, a pin 90 (Figs. 1 and 5) which maintains a socket at the lower end of cranking element 81 in engagement with the flat faced-off upper end of shank 80 is removed and also element 81 and the latter replaced by a socket 92, secured at 94 to an extension shank bar 96. The element 81 and crank bar 82 are reattached with another pin like pin 90 to a complementary flattened and perforated tip 98 riveted to the outer end of extension shank 96.

Comparing Figs. 7 and 8 with Figs. 11 and 12, the modification shown in the latter is used on a rack frame in which the automatic clamping feature of the plunger 68 on the actuating bar is dispensed with. The elongated guide and stop housing 76 providing for the otherwise necessary lost motion described is hence omitted and a flanged plate 100 replacing it directly engages the rotating flange 84 at all times against outward movement in forcing the actuating bar from clamping position to unclamped position.

Provision is also made for using the rack as hitherto above described on pipe sections of greater diameter than those shown in relative proportion in the main figures of the drawing. This consists of an adapter illustrated in section in Fig. 15. It is there in the form of another arched but wider plate 102 having the conformation of and superposed intimately against the outer side of fixed jaw plate 18. It supplies extension jaw contacts 104 and 106 that extend beyond contacts 20 and 22 and react against a larger diameter pipe section A' in the same manner. The same figure outlines both contacts and in all respects the functions and mode of operation remain the same with the extension jaws in use. The jaw plate 102 is, in the present instance, detachably secured to the main fixed jaw plate 18, as by means of bolts 108 passing through holes 110 (Fig. 7) spaced at intervals along the plate 18, and corresponding holes in the adapter plate 102. Fig. 15 shows in dotted lines at A the diameter of the pipe with which the rack structure is normally intended to operate when the adapter is not used (for example, a standard four-inch cast iron soil pipe) and shows in full lines at A' the pipe of larger size (e. g., a five-inch cast iron soil pipe) which may be accommodated by using the adapter 102.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A pipe alining rack including three elongated metal angle plates each having two marginal flanges at an angle to each other, all three of said plates being fastened in fixed relation to each other with one flange of the first plate and one flange of the second plate arranged parallel to and spaced from each other and with another flange of the first plate and another flange of the second plate arranged at an angle to each other and both secured to the third plate, a jaw plate movably mounted between and guided by the two spaced flanges of said first and second angle plates, pin and slot means holding said jaw plate against longitudinal movement relatively to said first and second angle plates while guiding it for lateral movement between said spaced flanges, said jaw plate having an outer alining edge projecting laterally beyond said spaced flanges of said angle plates, an actuating bar also mounted between and guided for longitudinal movement relative to the two spaced flanges of said first and second angle plates, said actuating bar being located between said jaw plate and said third angle plate, cooperating inclined cam surfaces on said jaw plate and actuating bar to cause lateral inward and outward movement of said jaw plate upon longitudinal movement of said actuating bar, and screw thread means operatively connected to one end of said actuating bar to move said actuating bar longitudinally relative to said angle plates, so that when said alining rack is inserted longitudinally in two or more pipe sections with two of said marginal flanges engaging the interior surfaces of said pipe sections along two lines, said actuating bar may be moved longitudinally to displace said jaw plate radially outwardly to engage said interior surfaces along a third line, to aline the pipe sections with each other.

2. A pipe alining rack including three elongated metal angle plates each having two marginal flanges at an angle to each other, all three of said plates being fastened in fixed relation to each other with one flange of the first plate and one flange of the second plate arranged parallel to and spaced from each other and with another flange of the first plate and another flange of the second plate arranged at an angle to each other and both secured to the third plate, a jaw plate movably mounted between and guided by the two spaced flanges of said first and second angle plates, pin and slot means holding said jaw plate against longitudinal movement relatively to said first and second angle plates while guiding it for lateral movement between said spaced flanges, said jaw plate having an outer alining edge projecting laterally beyond said spaced flanges of said angle plates, an actuating bar also mounted between and guided for longitudinal movement relative to the two spaced flanges of said first and second angle plates, said actuating bar being located between said jaw plate and said third angle plate, cooperating inclined cam surfaces on said jaw plate and actuating bar to cause lateral inward and outward movement of said jaw plate upon longitudinal movement of said actuating bar, screw thread means operatively connected to one end of said actuating bar to move said actuating bar longitudinally relative to said angle plates, said screw thread means having a lost motion connection so that said actuating bar may move longitudinally to a limited extent relative to said angle plates without turning said screw thread means, and a plunger connected to said actuating bar at the end thereof opposite to said screw thread means and projecting longitudinally beyond said angle plates, so that when said alining rack is placed in a vertical position with said plunger resting on a floor, the contact of said plunger with the floor will hold said actuating bar against downward movement and gravity will tend to move said angle plates and jaw plate downwardly relative to said actuating bar to cause radial outward movement of said jaw plate relative to said angle plates.

3. A construction as defined in claim 1, in which two flanges of the third angle plate are provided, at intervals longitudinally of the third angle plate, with pairs of laterally alined holes, said construction further including a supporting bar insertable in any selected pair of holes to support the lower end of a pipe section when said pipe alining rack is in a vertical position.

References Cited in the file of this patent

UNITED STATES PATENTS

| Number | Name | Date |
|---|---|---|
| 725,874 | Riley | Apr. 21, 1903 |
| 890,453 | Rice et al. | June 9, 1908 |
| 1,166,284 | Vroman | Dec. 28, 1915 |
| 1,640,013 | Taylor et al. | Aug. 23, 1927 |
| 1,879,122 | Davis | Sept. 27, 1932 |
| 2,080,906 | Boyer | May 18, 1937 |
| 2,291,863 | Baker | Aug. 4, 1942 |
| 2,317,405 | Rutten | Apr. 7, 1943 |
| 2,522,459 | Mitchell | Sept. 12, 1950 |
| 2,523,519 | Reeves | Sept. 26, 1950 |
| 2,596,549 | Hamilton | May 13, 1952 |